United States Patent

[11] 3,575,354

[72] Inventor Frank Hach, Jr.
  Euclid, Ohio
[21] Appl. No. 875,943
[22] Filed Nov. 12, 1969
[45] Patented Apr. 20, 1971
[73] Assignee The Harris Calorific Company
  Cleveland, Ohio
  Continuation-in-part of application Ser. No. 785,146, Dec. 19, 1968, now abandoned.

[54] CUTTING TORCH TIP ASSEMBLY
  18 Claims, 7 Drawing Figs.
[52] U.S. Cl. .................................................. 239/422,
  239/424.5, 239/430
[51] Int. Cl. .................................................. B05b 7/06
[50] Field of Search ........................................ 239/422,
  423, 424, 424.5, 425.5, 430, 600, 601, 602;
  266/23

[56] References Cited
  UNITED STATES PATENTS
  3,433,418   3/1969   Hach, Jr. ..................... 239/430X Primary Examiner—M. Henson Wood, Jr.
Assistant Examiner—Michael Y. Mar
Attorney—Meyer, Tilberry and Body ABSTRACT: A cutting torch tip assembly including an elongated shell member having an internal axial passageway extending longitudinally therethrough. The passageway is of uniformly decreasing diameter adjacent its outlet end, and a circumferentially extending sealing surface defines the inlet end. Positioned within the passageway is an elongated, generally cylindrical, tip insert member having an inlet end and an outlet end. The outlet end of the insert is uniformly tapered and engages the correspondingly tapered outlet end of the passageway. The remaining portion of the insert is of a diameter substantially less than the diameter of the passageway. The inlet end of the insert terminates inwardly of the sealing surface of the shell and has an axially extending, circumferentially formed recess. A circumferential flange surrounds the recess and extends generally toward the inlet end of the shell. An annular, resilient seal member is positioned in the recess and has a free end portion extending outwardly of the recess and beyond the sealing surface of the shell.

Patented April 20, 1971

INVENTOR.
FRANK HACH JR.
BY
Meyer, Tilberry & Body
ATTORNEYS.

INVENTOR.
FRANK HACH JR.

CUTTING TORCH TIP ASSEMBLY

This application is a continuation-in-part of previously filed U.S. Pat. application Ser. No. 785,146, filed Dec. 19, 1968, now abandoned.

This invention is directed toward the gas cutting torch art and is more particularly concerned with an improved torch tip assembly.

The conventional gas cutting torch comprises a head portion provided with two internal passageways adapted to be respectively connected with a mixture of oxygen and fuel gas, and pure oxygen. A tip assembly is mounted on the head portion and usually includes a cylindrical outer shell having a longitudinally extending internal passage. An elongated tip insert member is positioned axially in the passage. The tip insert also has an internal longitudinal passageway. Usually, the internal passage of the outer shall is provided with a taper adjacent its outlet end. The outer surface of the tip insert is similarly tapered at the outlet end but provided with a plurality of grooves which, in combination with the shell, define the preheat orifice exit. The remaining untapered length of the insert is of lesser diameter than the shell passage thus forming an annular passage between the shell and the insert.

When assembled, the oxygen and fuel gas mixture passageway of the torch head is communicated with the annular chamber and the oxygen passageway is communicated with the passageway formed in the tip insert. Accordingly, the oxygen and fuel gas mixture passes through the annular chamber and the grooves formed in the tip insert to the outlet end of the shell. There it burns to provide the necessary preheat flame. Similarly, the oxygen passes through the central passageway of the insert to the outlet end of the shell where it contacts the preheated material to produce burning and cutting.

As can be appreciated, the various passageways between the torch head and the tip insert must be properly sealed relative to one another. Additionally, the connection between the head and the tip assembly, in addition to providing the necessary sealing, must provide structural integrity and rigidity.

Many prior constructions are available which will provide the necessary sealing and structural rigidity; however, substantially all of these prior constructions have definite and distinct disadvantages. First and most importantly is their complexity. Often they require several resilient seals, snap rings, and special adapter elements. Secondly, as a general rule, the prior constructions require extremely close machining tolerances. Thirdly, the combination of their complexity and close machining tolerances results in a relatively expensive tip assembly.

Considering the fact that in the field, the tips receive rough usage, they must be relatively frequently replaced. Consequently, the cost factor becomes somewhat important. Further, if the tip assembly is complex, the torch operators tend to blame malfunctions of their equipment on the tip assembly. Thus, one of the first things they will do is put in a new tip assembly or insert even though there was nothing wrong with the insert they were using.

The present invention provides a highly simplified torch tip assembly which overcomes the above-noted problems. Tip assemblies formed in accordance with the invention have a minimum number of parts and are highly reliable. Moreover, they do not require that manufacturing tolerances be closely held.

In accordance with the invention there is provided an improved torch tip assembly including an elongated shell member having an internal axial passageway extending longitudinally therethrough. The passageway terminates in an inlet end and an outlet end; with the passageway being of uniformly decreasing diameter adjacent the outlet. The inlet end of the passageway is defined by a circumferentially extending sealing surface. Positioned within the passageway is an elongated, generally cylindrical, tip insert member having an inlet end and an outlet end. The outlet end of the insert is uniformly tapered and engages the outlet end of the passageway. The remaining portion of the insert is of a diameter substantially less than the diameter of the passageway and the inlet end of the insert terminates inwardly of the sealing surface of the shell. Formed in the inlet end of the insert is an axially extending circumferential recess. A circumferential flange surrounds the recess and extends generally toward the inlet end of the shell. An annular, resilient seal member is positioned in the recess and has a free end portion extending outwardly of the recess and beyond the sealing surface of the shell.

The insert is supported at its inner or head end entirely by the resilient seal member engaging the torch head. Consequently, any slight variation in the machined length of the insert is automatically compensated for by the resilient support of the seal member. As a result of this, there is always a proper line-to-line fit between the outlet end portion of the insert and the shell passageway. This has the advantage of assuring that the preheat orifice exit area is uniform for all torches regardless of slight variations in insert length. The importance of this feature is that when the torch assemblies are used in a multitorch cutting machine all torches will perform the same i.e., all torches preheat the steel or other material to be cut at a uniform rate and, thus, it is not necessary to wait for the slowest torch of the machine before beginning cutting.

In accordance with another aspect of the invention the circumferential flange which surrounds the recess is formed by a sleeve member which is slidably received on the inlet end of the tip insert. This permits the resilient seal member to be rapidly and easily changed.

In accordance with a more limited aspect of the invention, the sleeve member is provided with a plurality of radially outwardly extending portions which are arranged to slidably engage the wall of the internal axial passageway of the shell. The outwardly extending portions function to locate the insert and prevent it from being shifted laterally in the shell during especially hard usage. This is accomplished in a manner which does not require holding close machining tolerances and which permits longitudinal movement of the insert relative to the shell compensate for variations in insert length. Also, the outlet end of the insert can engage the shell in line-to-line contact.

Accordingly, a primary object of the present invention is the provision of a torch tip assembly which is extremely simple in construction and reliable in operation.

A further object is the provision of a torch tip assembly which compensates for variations in the length of the tip insert member, while assuring proper fit between the tip insert and the outer shell.

Another object is the provision of a torch tip assembly which allows the tip insert member to be formed from stock having a diameter substantially equal to the final main diameter of the insert to thereby reduce the amount of scrap produced.

A still further object is the provision of a torch tip assembly that is generally less expensive than previous assemblies.

Yet another object is the provision of a torch tip assembly wherein the insert can engage the shell with proper line-to-line contact even though there are variations in the length of the insert of shell.

Still another object of the invention is the provision of a tip assembly of the type described wherein the insert can be self-centering and laterally supported in a manner which permits longitudinal adjustment.

These and other objects and advantages will become apparent from the following description used to illustrate the preferred embodiment of the invention as read in connection with the accompany drawings in which.

Figure 1:
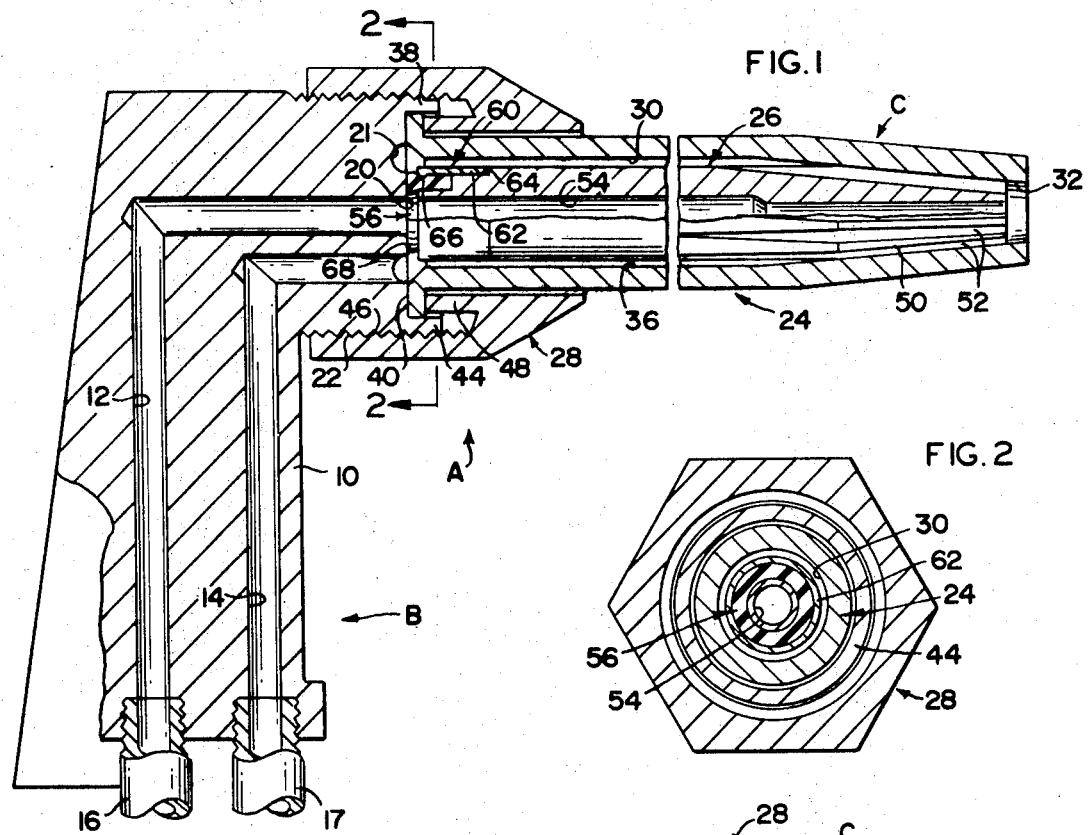
FIG. 1 is a longitudinal cross-sectional view through a torch having a tip assembly constructed in accordance with a preferred embodiment of the present invention.
Figure 2:
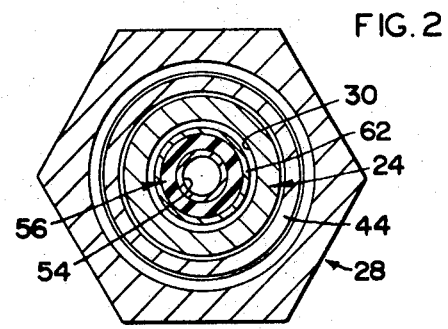
FIG. 2 is a cross-sectional view taken on line 2–2 of FIG. 1.

Referring now to the drawings wherein the showings are for the purpose of illustrating preferred embodiments of the invention only and not for the purpose of limiting the same, FIG. 1 shows the overall relationship of a torch A comprised of a standard head portion B and a first embodiment of the improved tip assembly C.

Broadly, the details of head portion B are not significant to the present invention. As shown in FIG. 1 however, head portion B includes a main body 10 having a pair of internal passageways 12 and 14 provided therein. Generally, these heads are formed by casting or forging and the passageways machined therein. The passageways are normally respectively communicated with a supply of pure oxygen and an oxygen and fuel gas mixture. As shown, pipes or hoses 16 and 17 are threadedly connected to the bottom of body 10 and extend to the necessary supply sources (not shown). Passageways 12 and 14 terminate in a machined face surface 20 provided with an annular distribution groove 21. Preferably, the end of body portion 10 is threaded at 22 to provide means for conveniently attaching tip assembly C.

As will become apparent hereafter, the actual construction of tip assembly C can vary substantially; however, it broadly comprises a tip shell 24 and a coaxial tip insert member 26. The shell 24 and insert member 26 are maintained snugly in engagement with one another and with the machined face surface 20 of the body portion 10 by a nut 28 threadedly connected to portion 22 of body 10.

In the embodiment under consideration, the tip shell 24 includes a central passageway 30 which extends longitudinally therethrough and terminates in an outlet end 32. The right-hand end portion of passageway 30 (as viewed in FIGS. 1 and 3) is uniformly tapered as shown at 34. The remaining portion 36 of passageway 30 is of generally uniform diameter back to the inlet end. A mounting flange 38 extends circumferentially about the inlet end. The end face 40 of flange 38 is relatively smoothly machined so that when the shell is clamped in position on head 10, a good metal-to-metal seal results between face 40 and head surface 20.

Although many different mounting arrangements could be provided for shell 24, it is preferably received in a recess 42 formed by a longitudinally extending circumferential flange 44 formed on head 10. Flange 44 is sized to closely receive the flange 38 of shell 24 to thereby center the shell on the head.

The shell 24 is releasably clamped in position on the head by nut member 28. As will be noted, the nut member 28 is threaded at 46 and includes an internal, longitudinally extending circumferential flange or shoulder 48 arranged to engage flange 38 on shell 24. Flange 48, of course, transmits the necessary clamping force from nut 28 to shell 24.

The structure thus far described is relatively conventional. The important feature of the subject invention is the arrangement of insert 26 and its relationship to the shell 24 and head 10. As was previously discussed, prior mounting and seal arrangements were somewhat complex. The subject arrangement however, is highly simplified and reliable in operation.

Figure 3:
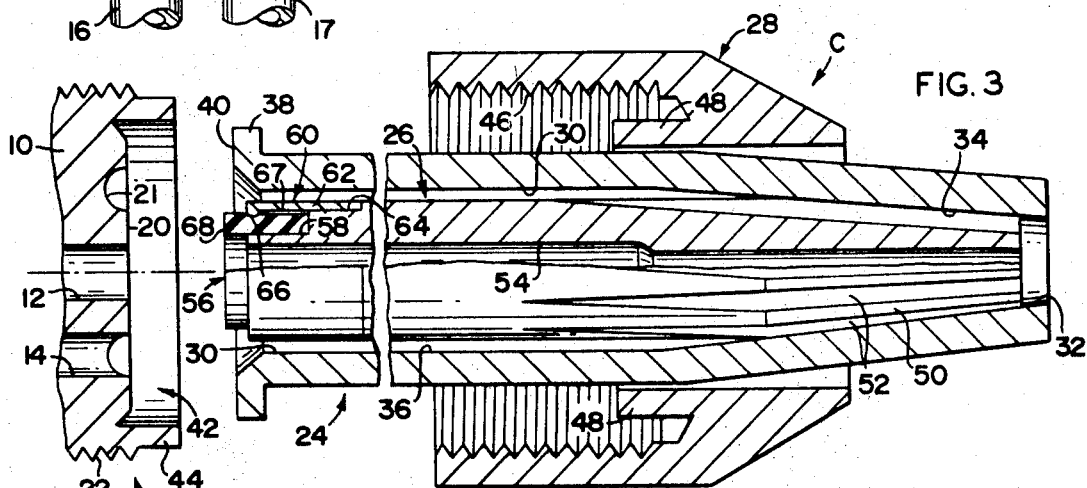
FIG. 3 is an enlarged cross-sectional view showing the parts of the tip assembly separated from the torch head.
Figure 4:
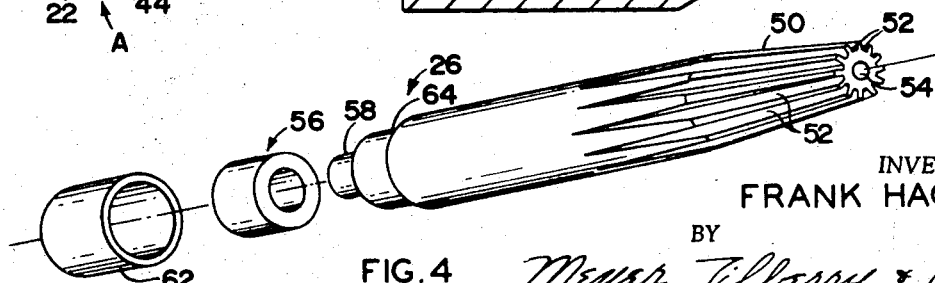
FIG. 4 is an exploded pictorial view showing the elements of the tip insert portion of the assembly.

Referring in particular to FIGS. 1 and 3, it is seen that the tip insert 26 extends axially of passageway 30 of shell 24. As shown, the insert 26 is generally cylindrical and has a maximum external diameter less than the diameter of portion 36 of shell passageway 30. The right-hand end of the insert is tapered at 50 to correspond to the internal tapered portion 34 of the tapered portion 50 and provide communication from the annular space between the insert and shell to the outlet end of the shell.

Extending longitudinally of the insert is a central passageway 54. This passageway serves to communicate pure oxygen from passageway 12 to the insert outlet.

As can be appreciated, the right-hand end of the insert 26 (as viewed in FIGS. 1 and 3) is centered and supported by the cooperation of the tapered portions 34 and 50. The left-hand or inlet end is both sealed and supported by a uniquely arranged resilient member 56 preferably formed from silicone rubber or similar heat resistant material. As will be understood from subsequent explanation, this member can have a variety of configurations. Preferably however, it is generally annular and has a rectangular cross section as shown. Member 56 is received in a longitudinally extending recess 58 formed in the left-hand end of the body of the insert. It is important that the recess 58 be provided with a circumferentially extending retaining flange 60. Although the flange 60 can, of course, be formed integrally with the main body of the insert, for reasons which will hereafter be discussed, it is desirable that the flange be provided by a separate collar or sleeve member 62 which is slip fitted on the end of the insert, the insert is recessed at 64 to receive the sleeve.

Referring to FIG. 3, it is seen that the recess 58 is preferably slightly wider in the radial direction than the normal thickness of member 56. Additionally, the sleeve member 62 preferably has a small circumferential lip 66 which extends radially inward to just engage the outer surface of member 56 in the normal position. This provides a small annular space or recess 67 between the exterior of member 56 and the interior of sleeve 62.

Relative length relationships which should be maintained between the tip shell and insert can be seen in FIG. 3. Note that when the insert is positioned within the shell, the length of the metal body portion including the flange 60, should terminate inwardly of the face 40. Also, the longitudinal dimension or length of the member 56 should be such that at least approximately one-half or more of its length is enclosed by flange 60. Moreover, the outwardly extending free length of member 56 should be such that the end surface 68 extends beyond surface 40 when the tip assembly is separated from the head.

With the above-noted length relationships maintained, connection of the tip assembly to the shell produces an effective seal and support for the inlet end of the insert. To explain, reference is made to FIG. 1 which shows the tip assembly connected to the head. Note that the end surface 68 of member 56 is in engagement with the central annular portion of head surface 20. Member 56 must, of course, be longitudinally compressed to permit the shell flange surface to engage the outer annular portion of surface 20. This compression produces forceful engagement between member 56 and surface 20 to provide a tight seal and, additionally, substantial radial stability because of friction. Further, the longitudinal compression produces radial expansion of member 56 within the end recess to provide a seal through this area. The flange 60 and lip 66 effectively lock the member 56 in position and prevent it from being shifted radially under the influence of the pressure of the oxygen entering from passageway 12.

As is apparent, the advantages flowing from the described construction are many. For example, the machined length of the insert is not critical. Further, the entire insert can be manufactured from a comparatively small diameter piece of stock and no critically positioned flanges, snapring grooves, etc., have to be machined. Moreover, no special mounting adapters or other such elements need to be provided.

Figure 6:
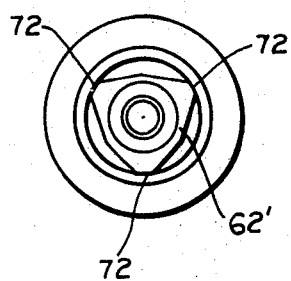
FIG. 6 is an enlarged end view taken on line 6—6 of FIG. 5.
Figure 5:
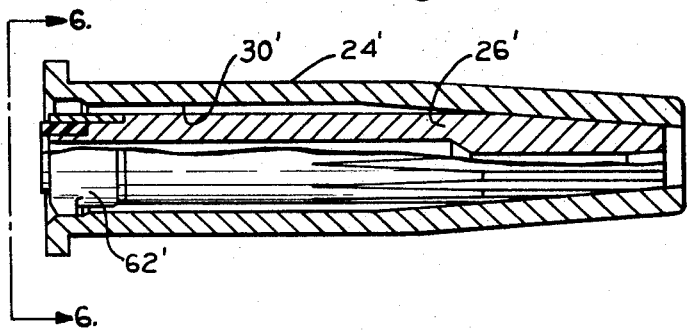
FIG. 5 is a cross-sectional view of a second embodiment of the invention provided with means which laterally locate the insert member.
Figure 7:
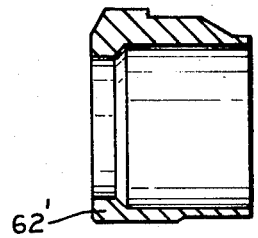
FIG. 7 is a cross-sectional view of the sleeve member per se.

FIGS. 5—7 of the drawings show a second embodiment of the invention which is especially adapted for use where the tip assembly is likely to be subjected to rough usage. In general this assembly is the same as the FIG. 1—4 embodiment. Like reference numerals have been used to designate the same elements of the two embodiments, with those of the FIGS. 5—7 embodiment differentiated from those of the FIGS. 1–4 embodiment by the addition of a prime (′) suffix. Accordingly the description of a FIG. 1–4 element is to be taken as equally applicable to the corresponding FIG. 5–7 element unless otherwise noted.

The primary difference between the two embodiments resides in the fact that in the FIG. 5–7 embodiment, the tip insert assembly is provided with locating means positioned at or adjacent the inlet end portion for engaging the inner wall passageway 30′ of shell 24′. The means function to center and locate the insert 26′ relative the passageway 30′ and, additionally and most importantly, the means prevent lateral shifting or tilting of the insert while permitting longitudinal movement between the insert and the shell.

The locating means could take many forms and, as will become apparent hereafter, be formed integrally with or separable from either the shell or insert. The preferred form and arrangement for the locating means is as shown and comprises a plurality of radially extending 72 formed integrally with the sleeve member 62′. In the embodiment under consideration there are three of the portions 72 spaced 120° apart. Each of the portions 72 extends outwardly from the center axis of the sleeve a distance substantially equal to the radius of the inlet end of the passageway 30′. This permits the portions 72 to slidably engage the passageway while properly centering and locating the insert. Additionally, the portions 72 prevent lateral shifting of the insert without materially interfering with gas flow through the annular passageway between the insert and shell.

The invention has been described in great detail sufficient to enable one of ordinary skill in the cutting torch art to make and use the same. Obviously modifications and alterations will occur to others upon reading and understanding this specification and it is my invention to include all such modifications and alterations as part of my invention insofar as they come within the scope of the appended claims.

I claim:

1. A cutting torch tip assembly adapted to be assembled with a cutting torch comprising:
   an elongated generally cylindrical shell member having an internal passageway extending longitudinally therethrough and terminating in an inlet end and an outlet end; said passageway having a portion tapering inwardly towards and at least adjacent said outlet end, said inlet end of said shell member having a continuous circumferentially extending sealing surface;
   an elongated, generally cylindrical, tip insert member having an internal passage and an inlet end and an outlet end and positioned within said passageway, said insert member having adjacent its outlet end a portion of substantially identical taper to said passageway taper and adapted to engage the tapered portion of said passageway, the remaining portion of said insert being of a diameter substantially less than the diameter of the other portion of the shell passageway, an axially extending circumferential recess on the inlet end of said insert, means defining a circumferential flange surrounding said recess; and,
   an annular, resilient axially compressible seal member positioned in said recess having a free end portion extending outwardly of said recess and adapted to be axially compressed on assembly with a cutting torch and both bias said tapered portions into engagement and seal said insert passageway from said shell passageway.

2. The invention as defined in claim 1 wherein said seal member has a rectangular cross section.

3. The invention as defined in claim 1 wherein said flange is defined by a sleeve member slip-fitted on said insert.

4. The invention as defined in claim 1 wherein said sealing surface is generally perpendicular to the longitudinal axis of said passageway.

5. The invention as defined in claim 1 wherein said recess has a radial width greater than the radial thickness of said sealing member and said flange terminates in a radially inwardly extending lip portion.

6. The invention as defined in claim 5 wherein said flange extends a distance sufficient to enclose at least approximately one-half of the length of said resilient member.

7. The invention as defined in claim 5 wherein said resilient member has a generally rectangular cross section.

8. A tip insert member for use in a cutting torch tip assembly comprising:
   an elongated generally cylindrical body portion having an opening extending axially therethrough from an inlet end to an outlet end, the exterior of said body portion adjacent said outlet end being of uniformly decreasing diameter and having a plurality of longitudinally extending grooves formed therein, the inlet end of said insert having an axially extending recess formed therein and surrounding the inlet end of said opening; means defining a longitudinally extending flange surrounding said recess; and,
   a generally annular resilient seal member positioned within said recess and having a free end portion extending outwardly of the insert in an axial direction.

9. The invention as defined in claim 8 wherein said flange is defined by a sleeve slip-fitted on the body portion of said insert.

10. The invention as defined in claim 8 wherein said resilient seal member has a rectangular cross section.

11. The invention as defined in claim 8 wherein said recess has a radial width greater than the radial thickness of said seal member and said flange terminates in a radially inwardly extending lip portion.

12. The invention as defined in claim 11 wherein said flange extends a distance sufficient to enclose at least approximately one-half of said resilient member.

13. The invention as defined in claim 8 including at least three radial projections adjacent the free end portion adapted to engage said shell passageway adjacent the inlet end.

14. The invention as defined in claim 8 including a sleeve member coaxial with said longitudinally extending flange which has a generally triangularly shaped periphery, the apices of said triangle adapted to engage the inner surface of the shell member passageway adjacent the inlet end.

15. A cutting torch tip assembly adapted to be assembled with a cutting torch comprising an elongated generally cylindrical torch shell member having an internal axial passageway extending longitudinally therethrough and terminating in an inlet end and an outlet end; said passageway having a portion tapering inwardly towards and at least adjacent said outlet end, said inlet end of said shell member having a sealing surface extending circumferentially around said passageway and adapted to sealingly cooperate with a surface on said torch; an elongated generally cylindrical tip insert member having an internal passage and an inlet end and an outlet end and positioned within said shell member passageway, said insert member having a portion of substantially identical taper to said passageway taper adjacent its outlet end and adapted to engage the tapered portion of said passageway, the remaining portion of said insert being of a diameter substantially less than the diameter of the other portion of the shell passageway, the inlet end of said insert when said shell member is assembled on a cutting torch terminating short of a sealing surface on said torch whereby said insert member would have a limited amount of free axial movement relative to said shell member and axially resilient sealing means associated with the inlet end of said insert member and a surface on said cutting torch of an axial dimension greater than the free movement of said insert member whereby when said tip assembly is assembled on a cutting torch, said resilient sealing means is axially compressed and bias said tapered portions into pressure engagement.

16. The improvement of claim 15 wherein said resilient seal is fastened to the inlet end of said insert member.

17. The invention as defined in claim 1 wherein said flange extends a distance sufficient to enclose at least approximately one-half of the length of said resilient member.

18. The invention as defined in claim 8 wherein said flange extends a distance sufficient to enclose at least approximately one-half of said resilient member.